(12) United States Patent
Venkataraghavan

(10) Patent No.: US 12,126,489 B2
(45) Date of Patent: Oct. 22, 2024

(54) SYSTEM, METHOD, AND COMPUTER PROGRAM FOR MANAGING DEPLOYMENT OF NETWORK ELEMENT

(71) Applicant: RAKUTEN MOBILE, INC., Tokyo (JP)

(72) Inventor: Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/012,535

(22) PCT Filed: Oct. 24, 2022

(86) PCT No.: PCT/US2022/047550
§ 371 (c)(1),
(2) Date: Dec. 22, 2022

(87) PCT Pub. No.: WO2024/091217
PCT Pub. Date: May 2, 2024

(65) Prior Publication Data
US 2024/0243964 A1 Jul. 18, 2024

(51) Int. Cl.
*H04L 41/12* (2022.01)
*H04L 41/0659* (2022.01)
(Continued)

(52) U.S. Cl.
CPC ...... *H04L 41/0661* (2023.05); *H04L 41/0816* (2013.01)

(58) Field of Classification Search
CPC ......... H04L 12/24; H04L 29/12; H04L 41/12; H04L 41/0893; G06F 15/173
(Continued)

(56) References Cited

U.S. PATENT DOCUMENTS

| 8,788,865 B2 * | 7/2014 | Mohammed | ............ H04L 12/10 713/340 |
| 2001/0052006 A1 * | 12/2001 | Barker | .................... H04L 41/22 709/223 |

OTHER PUBLICATIONS

International Search Report (PCT/ISA/210) dated Mar. 3, 2023 issued by the International Searching Authority in International Application No. PCT/US22/47550.
(Continued)

*Primary Examiner* — Jude Jean Gilles
(74) *Attorney, Agent, or Firm* — Sughrue Mion, PLLC

(57) ABSTRACT

Provided are apparatus, method, and device for managing deployment of network element. The apparatus includes: a memory storing instructions; and at least one processor configured to execute the instructions to: determine a status of a server hosting a network element; based on determining that the server has a first status: determine, based on a configuration profile from among a plurality of configuration profiles associated with the network element, an action for redeploying the network element; output information defining the action for redeploying the network element; based on determining that the server has a second status: determine an updated status of the server after a period of time from determining that the server has the second status; and determine, based on the updated status of the server, whether or not to redeploy the network element after the period of time.

20 Claims, 8 Drawing Sheets

(51) Int. Cl.
*H04L 41/0816* (2022.01)
*H04L 41/0893* (2022.01)
*G06F 15/173* (2006.01)

(58) Field of Classification Search
USPC ........................................... 709/221
See application file for complete search history.

(56) References Cited

OTHER PUBLICATIONS

Written Opinion (PCT/ISA/237) dated Mar. 3, 2023 issued by the International Searching Authority in International Application No. PCT/US22/47550.

\* cited by examiner

| Network Element | Configuration Profiles |
|---|---|
| Network Function A | Profile A1, Profile A2.... Profile An |
| Network Function B | Profile B1, Profile A2.... Profile Bn |
| Network Service C | Profile C1, Profile C2... Profile Cn |
| Network Service D | Profile D1, Profile D2.... Profile Dn |

FIG. 3

| Configuration Profile | Parameter 1 | Parameter 2 | Parameter 3 |
|---|---|---|---|
| Profile A1 | Config. A | Config. B | Config. C |
| Profile A2 | Config. X | Config. Y | Config. Z |
| Profile B1 | Config. A | Config. D | Config. E |
| ... | ... | ... | ... |
| Profile N | Config. N | Config. O | Config. P |

FIG. 4

SYSTEM, METHOD, AND COMPUTER PROGRAM FOR MANAGING DEPLOYMENT OF NETWORK ELEMENT

CROSS REFERENCE TO RELATED APPLICATIONS

This application is a National Stage of International Application No. PCT/US2022/047550 filed on Oct. 24, 2022.

1. Field

Apparatuses and methods consistent with example embodiments of the present disclosure relate to managing deployment of network elements and, more particularly, to managing redeployment of a software-based network element according to status of a server hosting the software-based network element.

2. Description of Related Art

Related art radio access networks (RANs), such as Open RAN (O-RAN) architectures, disaggregate one network component into multiple functional elements. For instance, a baseband unit (BBU) or base station is disaggregated into a number of functional elements including a distributed unit (DU), and centralized unit (CU), wherein the CU can be further disaggregated into Centralized Unit-Control Plane (CU-CP) and Centralized Unit-User Plane (CU-UP).

The disaggregation of network elements enables the network elements and the associated functions to be defined and provided in software-based form or virtual network services, such as Virtualized Network Functions (VNFs), Cloud-native Network Functions (CNFs) or Software Defined Networking (SDN), among others. Accordingly, the software-based network elements are deployed or hosted in, for example, a server cluster such as a hybrid cloud server, data center servers, and the like. A server may deploy or host a plurality of software-based network services, wherein a software-based network service may consist of a plurality of software-based network functions.

Typically, network elements failures may be categorized into two types: software failures (e.g., software corruption, algorithm design fault, etc.); and hardware failures (e.g., physical faults on server or the associated components due to wear and tear, physical damages on server or data center due to natural disaster, etc.).

In the related art, the approaches in addressing network elements failures due to software failures (e.g., restarting the failed network function/network service, updating the failed network function/network service, etc.) may be somewhat effective, but there is a need to further improve the approaches for addressing network elements failures due to hardware failures.

Specifically, in the related art, whenever the system detects a hardware failure on a server, the system will attempt to redeploy all network elements hosted on the server to another server (e.g., a backup/redundant server). Nevertheless, if there is no available server which can redeploy all network elements of the failure server, the system will simply declare a network element deployment failure and shut down all network elements hosted on the failure server. As a result, all network elements hosted on the failed server will not be functional and the user will experience a network downtime, which in turns results in severe negative impacts, such as: loss in business productivity and business opportunity, brand damages, and reduced user's experience.

In addition, after deploying all of the network elements from an original server (e.g., a source host server which has a hardware failure) into another server (e.g., a backup/redundant host server), the system may not timely restore or redeploy all of the network elements to the original server when the hardware failure of the original server is remediated. Accordingly, other servers in the same server cluster may not be able to utilize said other server for backup/redundancy purposes. In the case of multiple source host servers having hardware failure at the same time, the backup/redundant host server may only be utilized by one of the multiple source host servers while others will need to declare network element deployment failure resulting in network service failure.

SUMMARY

According to embodiments apparatus and methods are provided for continuously (or periodically) determines an action for managing deployment of a network element according to a status of a source host server and a configuration defined by a configuration profile among a plurality of configuration profiles associated with the network element. As a result, example embodiments of the present disclosure achieve an optimal network elements deployment whenever a host server experiences changes in hardware resources, the workload among the host servers can be more accurately and efficiently managed in real-time or near real-time, and network services downtime due to changes in host server can be reduced or avoided.

According to embodiments, an apparatus includes: a memory storing instructions; and at least one processor configured to execute the instructions to: determine a status of a server hosting a network element; based on determining that the server has a first status: determine, based on a configuration profile from among a plurality of configuration profiles associated with the network element, an action for redeploying the network element; and output information defining the action for redeploying the network element; based on determining that the server has a second status: determine an updated status of the server after a period of time from determining that the server has the second status; and determine, based on the updated status of the server, whether or not to redeploy the network element after the period of time.

The first status of the server may include: a partial hardware failure status in which the server has hardware resources to host the network element without complying with a first configuration for deploying the network element under a normal status, wherein the first configuration is defined in the configuration profile; or a full hardware failure status in which the server has no hardware resources to host the network element. The second status of the server may include the normal status in which the server has hardware resources to host the network element according to the first configuration.

The server may be a source host server, and the at least one processor may be configured to execute the instructions to: based on determining that the server has the first status, determine whether or not the network element can be redeployed on a redundant host server according to a first configuration defined by the configuration profile; and based on determining that the network element can be redeployed on the redundant host server according to the first configuration, determine that the action for redeploying the network element is an action for redeploying the network element on the redundant host server according to the first configuration.

The configuration profile may include a first configuration profile defining the first configuration and a second configuration profile defining a second configuration for deploying the network element, wherein the first configuration may be different from the second configuration. The at least one processor may be configured to execute the instructions to: based on determining that the server has the first status: determine whether or not the network element can be redeployed on the redundant host server according to the first configuration; based on determining that the network element can be redeployed on the redundant host server according to the first configuration, determine that the action for redeploying the network element is an action for redeploying the network element on the redundant host server according to the first configuration; based on determining that the network element cannot be redeployed on the redundant host server according to the first configuration, determine whether or not the network element can be redeployed on the redundant host server according to the second configuration; and based on determining that the network element can be redeployed on the redundant host server according to the second configuration, determine that the action for redeploying the network element is an action for redeploying the network element on the redundant host server according to the second configuration.

The second configuration may defines a minimum resource requirement for deploying the network element to achieve essential operational performance, and the at least one processor may be configured to execute the instructions to: based on determining that the network element cannot be redeployed on the redundant host server according to the second configuration, output information indicating a deployment failure of the network element.

Alternatively, the at least one processor may be configured to execute the instructions to: based on determining that the network element cannot be redeployed on the redundant host server according to the second configuration, determine whether or not the network element can be redeployed on the source host server according to the second configuration; based on determining that the network element can be redeployed on the source host server according to the second configuration, determine that the action for redeploying the network element is an action for redeploying the network element on the source host server according to the second configuration; and based on determining that the network element cannot be redeployed on the source host server according to the second configuration, output information indicating a deployment failure of the network element.

The at least one processor may be configured to execute the instructions to: after outputting the information defining the action for redeploying the network element on the redundant host server, monitor the status of the source host server; and based on determining that the status of the source host server changes from the first status to the second status, output information defining an action for redeploying the network element on the source host server.

The first configuration may define an optimal resource requirement for deploying the network element to achieve optimal operational performance. The second configuration may defines a minimum resource requirement for deploying the network element to achieve essential operational performance; and each of the first configuration and the second configuration may include a respective configuration of one or more of: number of cells per central unit, number of cells per radio unit, number of simultaneous processing per second, number of supported users, number of radio unit, number of distribution unit, number of uplink data layer, number of downlink data layer, capacity of memory, number of processing unit, number of cores per processing unit, clock frequency per processing unit, channel bandwidth, downlink/uplink throughput, number of single root input/output virtualization (SR-IOV), requirement of non-uniform memory access (NUMA), number of ports per network interface controller (NIC), and requirement of hardware acceleration.

According to embodiments, a method, performed by at least one processor, includes: determining a status of a server hosting a network element; based on determining that the server has a first status: determining, based on a configuration profile from among a plurality of configuration profiles associated with the network element, an action for redeploying the network element; and outputting information defining the action for redeploying the network element; based on determining that the server has a second status: determining an updated status of the server after a period of time from determining that the server has the second status; and determining, based on the updated status of the server, whether or not to redeploy the network element after the period of time.

The first status of the server may include: a partial hardware failure status in which the server has hardware resources to host the network element without complying with a first configuration for deploying the network element under a normal status, wherein the first configuration is defined in the configuration profile; or a full hardware failure status in which the server has no hardware resources to host the network element. The second status of the server may include the normal status in which the server has hardware resources to host the network element according to the first configuration.

The server may be a source host server, and the determining of the action for redeploying the network element may include: based on determining that the server has the first status, determining whether or not the network element can be redeployed on a redundant host server according to a first configuration defined by the configuration profile; and based on determining that the network element can be redeployed on the redundant host server according to the first configuration, determining that the action for redeploying the network element is an action for redeploying the network element on the redundant host server according to the first configuration.

The configuration profile may include a first configuration profile defining the first configuration and a second configuration profile defining a second configuration for deploying the network element, wherein the first configuration may be different from the second configuration. The determining of the action for redeploying the network element may include: based on determining that the server has the first status: determining whether or not the network element can be redeployed on the redundant host server according to the first configuration; based on determining that the network element can be redeployed on the redundant host server according to the first configuration, determining that the action for redeploying the network element is an action for redeploying the network element on the redundant host server according to the first configuration; based on determining that the network element cannot be redeployed on the redundant host server according to the first configuration, determining whether or not the network element can be redeployed on the redundant host server according to the second configuration; and based on determining that the network element can be redeployed on the redundant host server according to the second configuration, determining that the action for redeploying the network element is an action for redeploying the network element on the redundant host server according to the second configuration.

The second configuration may defines a minimum resource requirement for deploying the network element to achieve essential operational performance, and the method may further include: based on determining that the network element cannot be redeployed on the redundant host server according to the second configuration, outputting information indicating a deployment failure of the network element.

Alternatively, the method may further include: based on determining that the network element cannot be redeployed on the redundant host server according to the second configuration, determining whether or not the network element can be redeployed on the source host server according to the second configuration; based on determining that the network element can be redeployed on the source host server according to the second configuration, determining that the action for redeploying the network element is an action for redeploying the network element on the source host server according to the second configuration; and based on determining that the network element cannot be redeployed on the source host server according to the second configuration, output information indicating a deployment failure of the network element.

The method may further include: after outputting the information defining the action for redeploying the network element on the redundant host server, monitor the status of the source host server; and based on determining that the status of the source host server changes from the first status to the second status, output information defining an action for redeploying the network element on the source host server.

The first configuration may define an optimal resource requirement for deploying the network element to achieve optimal operational performance. The second configuration may defines a minimum resource requirement for deploying the network element to achieve essential operational performance; and each of the first configuration and the second configuration may include a respective configuration of one or more of: number of cells per central unit, number of cells per radio unit, number of simultaneous processing per second, number of supported users, number of radio unit, number of distribution unit, number of uplink data layer, number of downlink data layer, capacity of memory, number of processing unit, number of cores per processing unit, clock frequency per processing unit, channel bandwidth, downlink/uplink throughput, number of single root input/output virtualization (SR-IOV), requirement of non-uniform memory access (NUMA), number of ports per network interface controller (NIC), and requirement of hardware acceleration.

According to embodiments, a non-transitory computer-readable recording medium having recorded thereon instructions executable by a processor to cause the processor to perform a method including: determining a status of a server hosting a network element; based on determining that the server has a first status: determining, based on a configuration profile from among a plurality of configuration profiles associated with the network element, an action for redeploying the network element; and outputting information defining the action for redeploying the network element; based on determining that the server has a second status: determining an updated status of the server after a period of time from determining that the server has the second status; and determining, based on the updated status of the server, whether or not to redeploy the network element after the period of time.

The first status of the server may include: a partial hardware failure status in which the server has hardware resources to host the network element without complying with a first configuration for deploying the network element under a normal status, wherein the first configuration is defined in the configuration profile; or a full hardware failure status in which the server has no hardware resources to host the network element. The second status of the server may include the normal status in which the server has hardware resources to host the network element according to the first configuration.

The server may be a source host server, and the determining of the action for redeploying the network element may include: based on determining that the server has the first status, determining whether or not the network element can be redeployed on a redundant host server according to a first configuration defined by the configuration profile; and based on determining that the network element can be redeployed on the redundant host server according to the first configuration, determining that the action for redeploying the network element is an action for redeploying the network element on the redundant host server according to the first configuration.

The configuration profile may include a first configuration profile defining the first configuration and a second configuration profile defining a second configuration for deploying the network element, wherein the first configuration may be different from the second configuration. The determining of the action for redeploying the network element may include: based on determining that the server has the first status: determining whether or not the network element can be redeployed on the redundant host server according to the first configuration; based on determining that the network element can be redeployed on the redundant host server according to the first configuration, determining that the action for redeploying the network element is an action for redeploying the network element on the redundant host server according to the first configuration; based on determining that the network element cannot be redeployed on the redundant host server according to the first configuration, determining whether or not the network element can be redeployed on the redundant host server according to the second configuration; and based on determining that the network element can be redeployed on the redundant host server according to the second configuration, determining that the action for redeploying the network element is an action for redeploying the network element on the redundant host server according to the second configuration.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 3 illustrates a table of network elements and the associated configuration profiles, according to one or more embodiments;

FIG. 4 illustrates a table of configuration profiles and the configuration of parameters associated with hardware resources, according to one or more embodiments;

DETAILED DESCRIPTION

Figure 1:
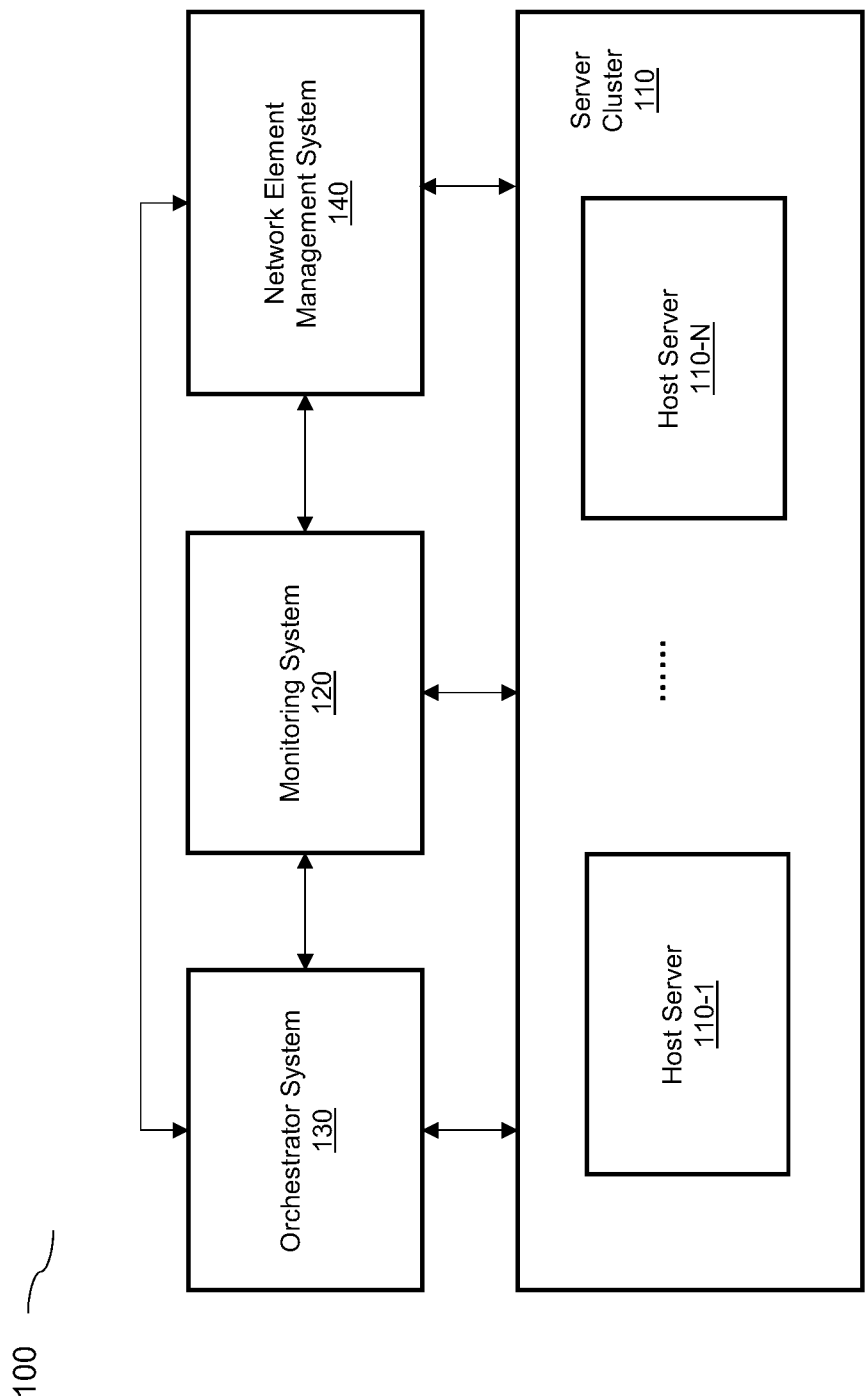
FIG. 1 illustrates a block diagram of a system 100 for managing deployment of network elements, according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Generally, network elements are deployed and hosted in a server (referred to as "host server" hereinbelow) based on hardware configurations pre-defined by a user (e.g., a network operator, a network monitoring team, a network admin, a vendor, etc.). A hardware failure may be a situation in which the host server experiences hardware changes that result in the host server unable to comply with the pre-defined hardware configurations. Hardware failure in a host server may include, but not limited to, mechanical and/or electronic failure in a hard drive, overheating of motherboard, electrical short circuit due to poor connections or high humidity, power source failure due to unexpected power outage, and physical damage on the server hardware. Furthermore, the hardware failure can be mainly categorized into two types: a partial hardware failure in which the host server experiences changes in hardware resources (e.g., reduction in available memory capacity or processing power, etc.) and is unable to host or deploy a network element (among a plurality of network elements) while fully complying with the pre-defined hardware configurations associated with the network element, and a full hardware failure in which the host server has no hardware resources to host or deploy any network element.

On the other hand, the hardware configurations (e.g., requirements on processing power, storage capacity, etc.) pre-defined by the user is typically an optimal hardware configuration, in which such hardware resources requirement is configured to be higher than the minimum hardware resources requirement. For instance, though a network element may require only 2 cores of processing power for performing the mandatory operations (i.e., the network element will not operate if the host server has less than 2 cores processing power), the user may pre-define the processing power configuration to be 3 cores (or higher), such that higher processing power will be assigned to this network element when being deployed and hosted in the server host. While such an approach may provide higher operational leeway and may improve the performance of the network element under normal status, it may reduce the efficiency, effectiveness, and accuracy in managing deployment of network elements when the host server experiences a hardware failure.

Specifically, in a related art system and method, in response to detecting that a host server has a hardware status that does not comply with a pre-defined hardware configuration of a network element stored in the host server, the system and method will determine that the host server has a hardware failure and will thereby attempt to redeploy all network elements hosted in the failure host server on a backup/redundant host server, regardless of whether or not the hardware failure is a partial hardware failure (i.e., the host server may still host or deploy some network elements) or a full hardware failure, and regardless of whether or not the pre-defined hardware configuration is an optimal hardware configuration (i.e., if the pre-defined hardware configuration is the optimal hardware configuration, the hardware failure may be a false alarm since the host server may still have sufficient resources to maintain the essential operation of the network element). In this regard, if the backup/ redundant host server does not has the capacity and computing resources to redeploy and host all network elements of the failure host server according to the pre-defined hardware configurations, related art system and method will simply declare a network elements deployment failure and disable the function of all network elements hosted in the failure host server, which results in network elements downtime. Moreover, if the disabled network elements consist of network services essential for a network operation, the network operation may be affected which may in turn result in a network downtime.

Further, in a related art, after determining that a hardware failure has occurred and after deploying the network elements in the backup/redundant host server or disabling all network elements, the system and method will require the original host server (i.e., the failure host server) to restore to a fully recovered status, in which the original host server has sufficient hardware resources to redeploy all network elements according to the pre-defined hardware configurations associated therewith. Namely, even if the original host server has partially restored and has sufficient hardware resources to host or deploy a network element or a portion of network elements, the system and method will still not redeploy said network element or said portion of network elements in the original host server (since the host server still does not have sufficient hardware resources to deploy all network elements).

In this regard, if there is no available backup/redundant host server and all network elements hosted in the original host server have been disabled based on determining that the original host server has a hardware failure status, the related art system and method will simply continue to disable all network elements until the original host server has sufficient hardware resources to redeploy all network elements according to the pre-defined hardware configurations. Similarly, if there is an available backup/redundant host server and all network elements of the original host server have been redeployed on the backup/redundant host server, the related art system and method will simply wait until the original host server has recovered to have sufficient hardware resources to redeploy all network elements, before redeploying the network elements on the original host server and removing the network elements from the backup/redundant host server to clear the capacity thereof. In the former case, the user will experience a network service down time longer than required, while in the latter case the network services from the original host server will consume the resources of the backup/redundant host server longer than required.

Example embodiments of the present disclosure provide a system and method that continuously (or periodically) determines an action for managing deployment of a network element according to a status of a source host server (i.e., a host server hosting or deploying the network element) and a configuration defined by a configuration profile among a plurality of configuration profiles associated with the network element.

In some embodiments, based on determining that the source host server has a first status (e.g., a hardware failure status, etc.) and based on determining that a backup/redundant host server is available, the system and method of the present disclosures can determine the status of the backup/redundant host server (e.g., status of available resources, etc.) and perform an appropriate action for redeploying the network element accordingly. The action for redeploying the network element includes, but is not limited to, redeploying all network elements on the backup/redundant host server according to a first configuration defined by a first configuration profile, and redeploying all network elements on the backup/redundant host server according to a second configuration defined by a second configuration profile when the redundant server has no sufficient resources to deploy all network elements on the backup/redundant host server according to the first configuration but has sufficient resources to deploy all network elements according to the second configuration.

In some embodiments, the action for redeploying the network element on the backup/redundant host server may further include: redeploying a portion of network elements (e.g., network elements constituting critical network services, network elements associated with configuration profiles which has a higher priority, etc.) in the redundant host server according to a third configuration defined by a third configuration profile when the redundant server has no sufficient hardware resources to deploy all network elements but has sufficient hardware resources to deploy the portion of network elements according to the third configuration, and redeploying a portion of network elements in the redundant host server according to a fourth configuration defined by a fourth configuration profile and redeploying the remaining portion of network elements in one or more host servers (e.g., host server hosting or deploying other network elements) according to a fifth configuration defined by a fifth configuration profile.

In some embodiments, based on determining that the source host server has a first status (e.g., partial hardware failure status) and based on determining that there is no available backup/redundant host server, the system and method of the present disclosure determines the status of the source host server (e.g., status of available resources, etc.) and redeploys one or more of the network elements on the source host server according to a configuration defined by a configuration profile different from the first configuration profile (e.g., the configuration profile defining configuration for deploying the network elements under normal status).

Further, in some embodiments, after redeploying network elements in a backup/redundant host server, the system and method of the present disclosure continuously (or periodically) determines an updated status of the source host server. Based on determining that the source host server has recovered (e.g., partially recovered or fully recovered) and has sufficient resources to redeploy one or more network elements, the system and method of the present disclosure determines an action for redeploying the network elements on the source host server, so as to free up the resources of the backup/redundant host server. The action for redeploying the network elements may redeploy a portion of network elements or redeploy all of network elements on the source host server, according to the resources available in the source host server.

Furthermore, in some embodiments, based on determining that the source host server has a second status (e.g., a normal status), the system and method of the present disclosure continue to determine an updated status of the source host server (e.g., a status of the source host server after a period of time from determining that the source host server has the second status) and to determine whether or not to redeploy a network element in the source host server based on the updated status of the source host server. Accordingly, the system and method of the present disclosure may continue to monitor the status of the source host server even if the source host server does not has a failure yet, and may quickly determine (e.g., in real-time or near real-time) an action to redeploy the network element if the updated status indicates that a redeployment of network element is required (e.g., based on determining that the updated status is the first status, etc.).

Ultimately, example embodiments of the present disclosure achieve an optimal network elements deployment whenever a host server experiences changes in hardware resources, the workload among the host servers (e.g., source host server, backup/redundant host server, etc.) can be more accurately and efficiently managed in real-time or near real-time, and network services downtime due to changes in host server can be reduced or avoided.

FIG. 1 illustrates a block diagram of a system 100 for managing deployment of network elements, according to one or more embodiments. Referring to FIG. 1, the system 100 includes a server cluster 110, a monitoring system 120, an orchestrator system 130, and a network element management system 140.

The server cluster 110 includes a plurality of host servers (collectively referred to as "host servers 110-1" herein after), each of which is hosting or deploying (or is configured to host or deploy) a plurality of network elements. In some embodiments, the server cluster 110 further includes a backup/redundant server, wherein the number of backup/redundant server is the total number of host servers (N)+1. In some embodiments, the number of backup/redundant server is greater than N+1 (e.g., N+2, N+3, etc.). In some embodiments, one or more of the host servers (i.e., server hosting or deploying network elements) may have the role of backup/redundant server.

The plurality of network elements hosted or deployed in the host servers 110-1 includes, but is not limited to, one or more software-based network services, wherein the one or more software-based network services may further include one or more software-based network functions (to be further described below). In some embodiments, one or more of the host servers 110-1 may be a public cloud server, a private cloud server, a dedicated cloud server, a hybrid cloud server, or any suitable commercial-off-the-shelf (COTS) server. In some embodiments, one or more of the host servers 110-1 may be configured to host or deploy network elements so as to provide network services in the form of, but not limited to, infrastructure as a service (IaaS), platform as a service (PaaS), Software as a Service (SaaS), and function as a service (FaaS).

The monitoring system 120 is communicatively coupled to the server cluster 110, the orchestrator system 130, and the network element management system 140. In some embodiments, the monitoring system 120 may be configured to continuously (or periodically) monitor and collect telemetry data (e.g., via API calls) from the server cluster 110, from the orchestrator system 130, and/or from the network element management system 140. In some embodiments, the monitoring system 120 may be configured to collect status data of one or more of the host servers 110-1 and backup/redundant server in the server cluster 110 and provide the status data to the orchestrator system 130 for further processing (to be described below). In some embodiments, the monitoring system 120 may be configured to collect status data of one or more of the host servers 110-1 and backup/redundant server in the server cluster 110 and provide the status data to the network management system 140 for further processing (to be described below). In some embodiments, the monitoring system 120 may be configured to collect status data from the orchestrator system 130 and the network element management system 140, and provide the collected status data to each other and/or to the server cluster 110 when required.

In some embodiments, the monitoring system 120 may comprise an observability framework which may be configured to provide continuous (or periodical) network observability. For instance, the observability framework may be configured to collect logs, metrics, and/or traces associated with one or more of the server cluster 110 (and the host servers 110-1 and backup/redundant host server included therein), orchestrator system 130, and network element management system 140, and thereby provides comprehensive insights thereof. In this regard, the monitoring system 120 may be configured to monitor and collect, in real-time or near real-time, status data (e.g., health status, status of available hardware resources, etc.) of each of the host servers 110-1 and backup/redundant host server in the server cluster 110, failure or fault data (e.g., data defining a software failure, a partial hardware failure, a full hardware failure, etc.), logs of network elements redeployment process, traces of the operations of network elements deployment/redeployment performed by the network element management system 140, and any other suitable data which provides informative insights on the status, activity, and performance of the system.

The orchestrator system 130 is communicatively coupled to the monitoring system 120, the server cluster 110, and the network element management system 140. In some embodiments, the orchestrator system 130 may be configured to receive data from the monitoring system 120 and based on determining (via the received data) that one of the host servers 110-1 of the server cluster 110 has a first status (e.g., partial hardware failure status, full hardware failure status, etc.), the orchestrator system 130 may be configured to communicate with the server cluster 110 to obtain further information (e.g., information of availability of backup/redundant host server, etc.) so as to determine an appropriate responding action (to be further described below). Subsequently, the orchestrator system 130 may be configured to provide information defining the determined action to the network element management system 140, such that the network element management system 140 may then perform the determined action to manage the network elements (e.g., redeploy the network elements to the backup/redundant host server in a specific manner, etc.). Alternatively, based on determining that said one of the host servers 110-1 has a second status (e.g., a normal status), the orchestrator system 130 may be configured to continuously or periodically receive data from the monitoring system 120 so as to determine an updated status of said one of the host servers 110-1 (e.g., a status of said one of the host servers 110-1 after a period of time from determining that the source host server has the second status).

In some embodiments, the orchestrator system 130 may comprise a service management and orchestration (SMO) platform complying with requirements defined by the Open Radio Access Network (O-RAN) Alliance. In some embodiments, the orchestrator system 130 may be configured to provide end-to-end automation in lifecycle management (e.g., on-boarding, instantiation, redeployment, healing, scaling, termination, etc.) of one or more network elements hosted or deployed in one or more of the host servers 110-1.

The network element management system 140 is communicatively coupled to the monitoring system 120, orchestrator system 130, and server cluster 110. In some embodiments, the network element management system 140 may be configured to receive, from the orchestrator system 130, data or information defining an action for managing one or more network elements. Subsequently, the network element management system 140 may be configured to perform the action to manage the one or more network elements. For instance, the network element management system 140 may be configured to receive, from the orchestrator system 130, information defining an action to redeploy a network element when hardware failure is detected in the associated source host server, and the network element management system 140 may be configured to thereby redeploy the network element accordingly. After redeployment of the network element, the network element management system 140 may be configured to provide to the monitoring system 120 a request for data or information defining an updated status of the host server in which the network element is redeployed. Subsequently, the network element management system 140 may be configured to receive the requested data or information from the monitoring system 120, so as to determine whether or not the redeployment of the network element is successful or has failed. In case the redeployment of network element is failed or incomplete within a period of time, the network management system 140 may be configured to re-perform the redeployment of the network element until the redeployment is successful or until the number of redeployment attempts reaches a predetermined threshold, or the network management system 140 may be configured to send to the orchestrator system 130 data or information indicating the unsuccessful redeployment of network element so that the orchestrator system 130 may determine a new action for redeploying the network element.

In some embodiments, the network management system 140 may be configured to perform one or more of: fault management operation, configuration management operation, account management operation, performance management operation, and security management operation (FCAPS operations), on one or more network elements hosted or deployed in one or more host servers 110-1.

In some embodiments, the network management system 140 may include an operational support system (OSS) and an element management system (EMS), each of which is configurable to perform one or more of the FCAPS operations. In some embodiments, the network element management system 140 includes a plurality of EMSs, each of the plurality of EMSs may be configured to manage a single network element or a group of network elements associated with a particular vendor/network service provider, and the OSS interfaces between the monitoring system 120, orchestrator 130, and the plurality of EMSs. Accordingly, the network element management system 140 may provide a single control point for managing one or more network elements associated with multiple vendors/network service providers via only one monitoring system and one orchestrator system (i.e., one monitoring system and one orchestrator system can be utilized to manage network elements associated with multiple vendors/network service providers).

Figure 2:
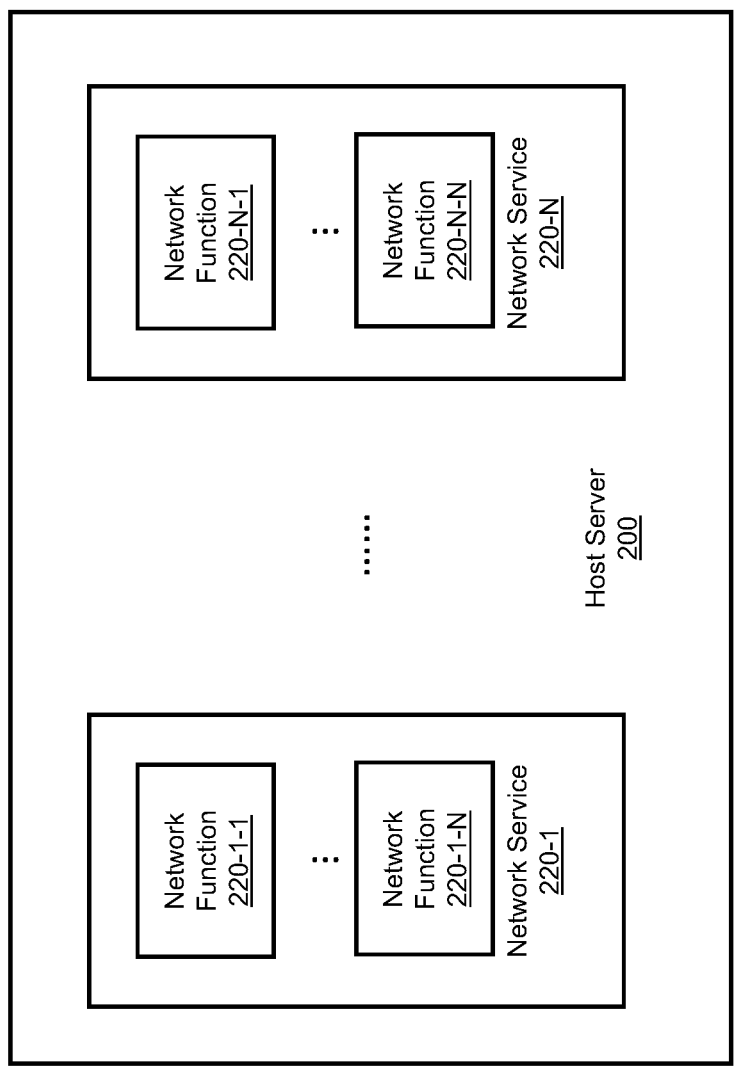
FIG. 2 illustrates a block diagram of a host server 200 for hosting and deploying network elements, according to one or more embodiments.

FIG. 2. illustrates a block diagram of a host server 200 for hosting or deploying one or more network elements, according to one or more embodiments. The host server 200 may correspond to one or more of host servers 110-1 in FIG. 1, and both of host server 200 and host server 110-1 may be configured to perform one or more operations described in relation to each other.

Referring to FIG. 2, the host server 200 may comprise computer resources (e.g., storage hardware, processing unit, memory, input/output chipset, etc.) for hosting or deploying a plurality of network services (collectively referred to as "network services 220-1" hereinafter), wherein each of the network services 220-1 may consist of one or more network functions (collectively referred to as "network function 220-1-1" hereinafter). It is apparent that the term "network element" used herein encompass one or more of "network service" and "network function".

In some embodiments, a portion of the network functions 220-1-1 and/or a portion of the network services 2201- is provided by multiple vendors or multiple network service providers. For instance, a network function A of network service A may be provided by a vendor A, and a network function B of the same network service A may be provided by a vendor B. Similarly, a network service B hosted or deployed within the host server 200 may be provided by a vendor C, and another network service C hosted or deployed within the same host server 200 may be provided by a vendor D.

In some embodiments, a portion of the network functions 220-1-1 and/or a portion of the network services 220-1 are virtualized and are hosted in the host server 200 in a form of virtualized machines (VMs). In this regard, the host server 200 may comprise one or more hypervisors interfacing the hardware resources of host server 200 and the virtualized network functions and/or virtualized network services, so as to manage the utilization of hardware resources of host server 200 to operate the virtualized network functions and/or virtualized network services. The one or more hypervisors may be hardware-based, software-based, or firmware-based.

In some embodiments, host server 200 is a Kubernetes (K8s) based server, and a portion of the network functions 220-1-1 and/or a portion of the network services 220-1 are containerized. For instance, a network function may be provided in a form of a container, and a plurality of containerized network functions may be hosted or deployed in a pod to thereby form a microservice. To this end, a plurality of microservices may form a containerized network service.

In some embodiments, the network elements (i.e., network functions 220-1-1 or network service 220-1) are software-based (e.g., virtualized, containerized, etc.) and comprise one or more of: a software-based radio unit (RU) (e.g., implementing at least some function of the RU), software-based distribution unit (DU), software-based centralized (or central) unit (CU), software-based near real-time radio intelligent controller (near RT-RIC), and any network elements which are suitable to be hosted or deployed in software or virtualized form.

FIG. 3 illustrates a table of network elements and associated configuration profiles, according to one or more embodiments. Referring to FIG. 3, each of the network elements may be associated with a plurality of configuration profiles, wherein each of the plurality of configuration profiles comprises a configuration of parameters associated with hardware resources of the host server to which the network element can be deployed or hosted (to be described below).

In some embodiments, the configuration profiles are predefined by a network operator. In some embodiments, the configuration profiles are predefined by a vendor or network service provider. In some embodiments, a portion of the configuration profiles are predefined by the network operator and another portion of the configuration profiles are predefined by the vendor or network service provider. For instance, the vendor or network service provider may define in a first configuration profile the hardware resource requirements for deploying a network element to achieve optimal operational performance under normal status, while the network operator may define in a second configuration profile the hardware resource requirements for deploying the network element to achieve minimal or essential operational performance whenever the host server experiences hardware resources changes (e.g., when the host server experiences a hardware failure, etc.). The "network operator", "vendor", and "network service provider" are collectively referred to as "the user" hereinbelow, unless explicitly recited otherwise.

In some embodiments, in order to deploy or host a new network element, the user provides the new network element along with the associated configuration profile(s) to a network element management system (e.g., network element management system 140). Subsequently, the network element management system will deploy the new network element in a host server (e.g., host server 110-1, host sever 200, etc.) according to the configuration defined in the configuration profile(s). In some embodiments, the new network element is associated with a list of configuration profiles, and during the first attempt of the network element deployment, the network element management system deploys the new network element according to a first configuration profile in the list of configuration profiles. In some embodiments, if the first attempt of the network element deployment according to the first configuration profile is unsuccessful, the network element management system may perform a subsequent attempt of network element deployment according to a subsequent configuration profile (e.g., a second attempt according to a second configuration profile, a third attempt according to a third configuration profile, etc.) in the list of configuration profiles until the new network element is successfully deployed or hosted in the host server.

In some embodiments, based on determining that the deployment of the new network element is completed, the network element management system provides the deployment information (e.g., network element ID, host server ID, etc.) along with the configuration profile(s) associated with the new network element to an orchestrator system (e.g., orchestrator system 130). The configuration profile(s) may be provided in a list form, in a table form, or in any other suitable form which define the relationship or map between the network element and the associated configuration profile(s). Further, the configuration profile(s) can be stored by the orchestrator system 130 in a storage medium within the orchestrator system 130 or external to the orchestrator system 130. As will be discussed below, the orchestrator system 130 utilizes the configuration profile(s) to determine an action for managing the network element when the host server hosting the network element experiences changes in hardware resources (e.g., a hardware failure, etc.).

In some embodiments, one or more of the plurality of configuration profiles is configurable or adjustable by the user. For instance, after deployment of a network element, the user can update the configuration defined in an associated configuration profile by, for example but not limited to, providing to the network element management system an updated configuration profile having the same profile ID, such that the network element management system may then forward the updated configuration profile to the orchestrator system and the orchestrator system may then update the respective configuration profile (e.g., replace the stored configuration profile with the updated configuration profile, etc.). In yet another example, the user can add a new configuration profile to a hosted or deployed network element by, for example but not limited to, providing to the network element management system a new configuration profile having the same network element ID, such that the network element management system may then forward the new configuration profile to the orchestrator system and the orchestrator system may then add the new configuration profile to the associated network element (e.g., add the new configuration profile to a list of configuration profiles associated with the network element, etc.).

FIG. 4 illustrates a table of configuration profiles and associated configuration of parameters, according to one or more embodiments. One or more of the configuration profiles in FIG. 4 may correspond to one or more of the configuration profiles in FIG. 3. One or more of the parameters may be associated with the hardware resources of a host server.

Further, a plurality of configuration profiles may be associated with one network element. For instance, both configuration profile A1 and configuration profile A2 may be associated with network function A (illustrated in FIG. 3), wherein each of configuration profile A1 and configuration profile A2 has different configurations on the same parameters (e.g., configuration profile A1 has configuration A on parameter 1 while configuration profile A2 has configuration X on the same parameter 1, etc.). In some embodiments, one network element may have more than two configuration profiles associated therewith. In some embodiments, multiple configuration profiles may have the same configuration on a parameter while having different configuration on other parameters (e.g., both configuration profile A1 and configuration B1 has the same configuration A on parameter 1 and has different configurations on parameter 2 and parameter 3, etc.). In some embodiments, multiple network elements may have one or more same configuration profiles (e.g., both network function A and network function B may have the same configuration profile A2 associated therewith).

In some embodiments, the parameters associated with resources of the host server include, but are not limited to: number of cells per central unit, number of cells per radio unit, number of simultaneous processing per second, number of supported users, number of radio unit, number of distribution unit, number of uplink data layer, number of downlink data layer, capacity of memory (in KB, MB, GB, etc.), number of processing unit, number of cores per processing unit, clock frequency per processing unit, channel bandwidth (in KHz, MHz, GHz, etc.), downlink/uplink throughput (in Kbps, Mbps, Gbps, etc.), number of single root input/output virtualization (SR-IOV), requirement of non-uniform memory access (NUMA), number of ports per network interface controller (NIC), and requirement of hardware acceleration. It will be apparent that the parameters are not limited to those described hereinabove, and the parameters may contain any other suitable parameters which are associated with the deployment of network element. In some embodiments, one or more of the parameters may be configured by a user by assigning (to the one or more parameters) an exact value, a range of values, a threshold value, and/or a written condition.

In some embodiments, multiple configuration profiles associated with a network element may be arranged in a sequential manner and may be utilized according to priority of utilization. For instance, referring to FIG. 3 and FIG. 4, network function A may be associated with configuration profile A1 and configuration profile A2, and since configuration profile A1 is placed before configuration profile A2, the system (e.g., network element management system 140) will determine that configuration profile A1 has a priority higher than configuration profile A2 and will attempt to first utilize configuration profile A1 (e.g., deploy network function A according to configurations defined by configuration profile A1) before utilizing configuration profile A2. In some embodiments, the first configuration profile is a default configuration profile defining the configurations in which the associated network element(s) should be deployed under normal status, while the configuration profiles after the first configuration profile (i.e., the second configuration profile, the third configuration profile, etc.). will only be utilized under specific conditions (e.g., network element deployment according to the first configuration profile is unsuccessful, etc.).

In some embodiments, the first configuration profile is a primary configuration profile defining configurations for deploying the network element to achieve ideal or optimal operational performance (e.g., high benchmark, high media quality, low latency, high communication speed, etc.), and the subsequent configuration profile(s) is a secondary configuration profile(s) defining configurations for deploying the network element to achieve a minimal or essential operational performance (minimal acceptable benchmark, minimal acceptable media quality, minimal acceptable latency, minimal acceptable communication speed, etc.). For instance, referring to FIG. 3 and FIG. 4 in which network function A may be associated to configuration profile A1 and configuration profile A2, configuration profile A1 may be a primary configuration profile for deploying network element A in normal status (e.g., when the host server has sufficient hardware resources to host network function A according to the configuration defined in the configuration profile A1 so as to achieve ideal or optimal operational performance, etc.), wherein the configurations of configuration profile A1 (e.g., configuration A, configuration B, and configuration C) define resource requirements (e.g., requirements on parameter 1, parameter 2, and parameter 3) higher than the minimum resource requirements for operating network function A; on the other hand, configuration A2 may be a secondary configuration profile for deploying network element A in a specific condition (e.g., when the host server has no sufficient hardware resources to deploy network element A according to configuration profile A1 due to hardware resources reduction, etc.), wherein the configurations of configuration profile A2 (e.g., configuration X, configuration Y, configuration Z) define resource requirements (e.g., requirements on parameter 1, parameter 2, and parameter 3) for operating the network element with reduced operational performance. In some embodiments, the configurations of secondary configuration profile (e.g., configuration profile A2) define minimum resource requirements for deploying the associated network element (e.g., network function A) to achieve minimal or essential operational performance. It will be apparent that the "ideal operational performance", "optimal operational performance", "minimal operational performance", and "essential operational performance" may be appropriately defined by the user as per requirement.

In some embodiments, one or more of the configuration profiles may include a parameter indicating the utilization priority thereof, and the system will utilize the configuration profile based on said parameter (instead of based on the sequential order of the configuration profile as described above). For instance, a user can specify a type of a configuration profile to be "default" or specify the configuration profile to be "highest priority", and accordingly the system will always attempt to first utilize said configuration profile regardless of the sequential order of said configuration profile.

Figure 5:
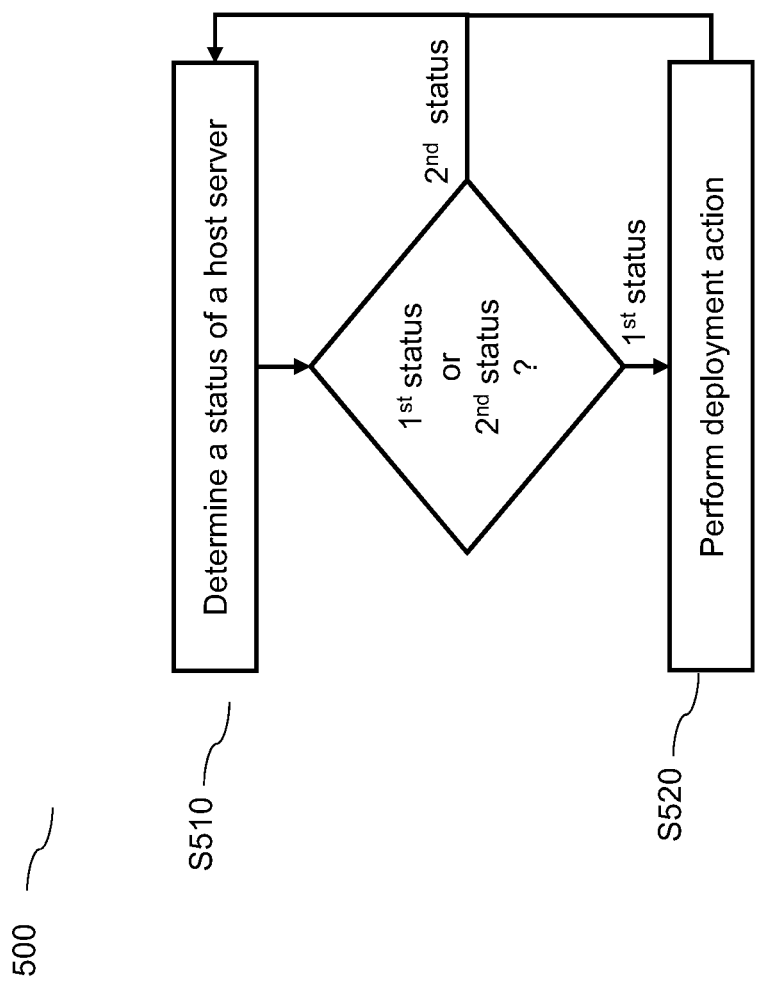
FIG. 5 is a flow diagram of a method 500 of managing a network element, according to one or more embodiments.

FIG. 5 is a flow diagram of a method 500 of managing a network element, according to one or more example embodiments. In general, a system monitors and determines a status of a host server, and based on determining that the host server has a first status (e.g., hardware failure status, etc.), the system performs deployment action on the network element hosted or deployed in the host server. As can be seen in FIG. 5, the method implements a feedback loop to continuously (or periodically) determine the status of the host server (e.g., when the attempt of determining the status of the host server has a second status, after performing the deployment action, etc.), so as to reiteratively and dynamically manage the deployment of the network element based on the latest or updated status of the host server, to thereby provide an optimal workload management for the host server.

Referring to FIG. 5, at operation S510, a status of a host server is determined. In some embodiments, the host server is included in a server cluster (e.g., server cluster 110), and a monitoring system (e.g., monitoring system 120) communicatively coupled to the server cluster may be configured to monitor the status of the host server and to provide (continuously or periodically) data defining the status of the host server to an orchestrator system (e.g., orchestrator system 130) communicatively coupled to the monitoring system. Subsequently, the orchestrator system may be configured to determine (based on the data received from the monitoring system) the status of the host server. For instance, the orchestrator system may be configured to determine whether the server has a first status (e.g., a partial hardware failure status, a full hardware failure status) or a second status (e.g., a normal status).

Although it is described hereinabove that the "first status" may be a type of "hardware failure status" and the "first status" may be a "normal status", it is apparent that the "first status" is merely a status for triggering the operation of performing deployment action (i.e., operation S520) and the "second status" is merely a status for not triggering the operation of performing deployment action, and the "first status" may not be limited only to any type of "hardware failure status" and the "second status" may not be limited only to the "normal status". Rather, it is apparent that the "first status" and the "second status" may also be any predefined status. For instance, the data received by the orchestrator system (provided by the monitoring system) may comprise information defining the hardware resource status of the host server, and the orchestrator system may be configured to compare the hardware resource status to a user's predefined condition(s) (e.g., host server maintains a capacity of X GB, channel bandwidth maintains in the range of Y MHz to Z MHz, etc.). Subsequently, based on determining that the hardware resource status is different from the user's predefined condition(s), the orchestrator system determines that the host server has a first status (e.g., a status in which the user's predefined condition(s) is violated), and based on determining that the hardware resource status is the same with the user's predefined condition(s), the orchestrator system determines that the host server has a second status (e.g., a status in which the user's predefined condition(s) is fulfilled). In yet another example, the orchestrator system may be configured to compare the hardware resource status to a hardware resource requirement defined by a configuration profile associated with a network element hosted or deployed in the host server, and based on determining that the hardware resource status is different from the hardware resource requirement defined by the configuration profile, the orchestrator system determines that the host server has a first status (e.g., a status in which the hardware resource requirements defined by the configuration profile are unable to be complied), and based on determining that the hardware resource status is the same with the hardware resource requirement defined by the configuration profile, the orchestrator system determines that the host server has a second status (e.g., a status in which the hardware resource requirements defined by the configuration profile are able to be complied).

Based on determining that the server has a first status, method 500 proceeds to operation S520. Otherwise, based on determining that the server has a second status, method 500 returns to operation S510, such that the system may continue monitoring and determining an updated status of the host server after a period of time from determining that the host server has the second status and may then determine whether or not to redeploy the network element after the period of time based on the updated status of the host server. To this end, the updated status of the host server may refer to a status of the host server after the period of time.

At operation S520, based on determining that the host server has the first status, a deployment action is performed. In some embodiments, the orchestrator system may be configured to determine, based on a configuration profile among a plurality of configuration profiles associated with a network element stored in the host server, an action for redeploying the network element (to be described below). The configuration profile may be stored in a storage medium within the orchestrator system, or may be retrieved from a storage medium external to the orchestrator system when required. Subsequently, the orchestrator system may be configured to output information defining the action for redeploying the network element. In some embodiments, said information will be outputted by the orchestrator system to a network element management system (e.g., network element management system 140), and the network element management system may be configured to perform the action to redeploy the network element accordingly.

Figure 6:
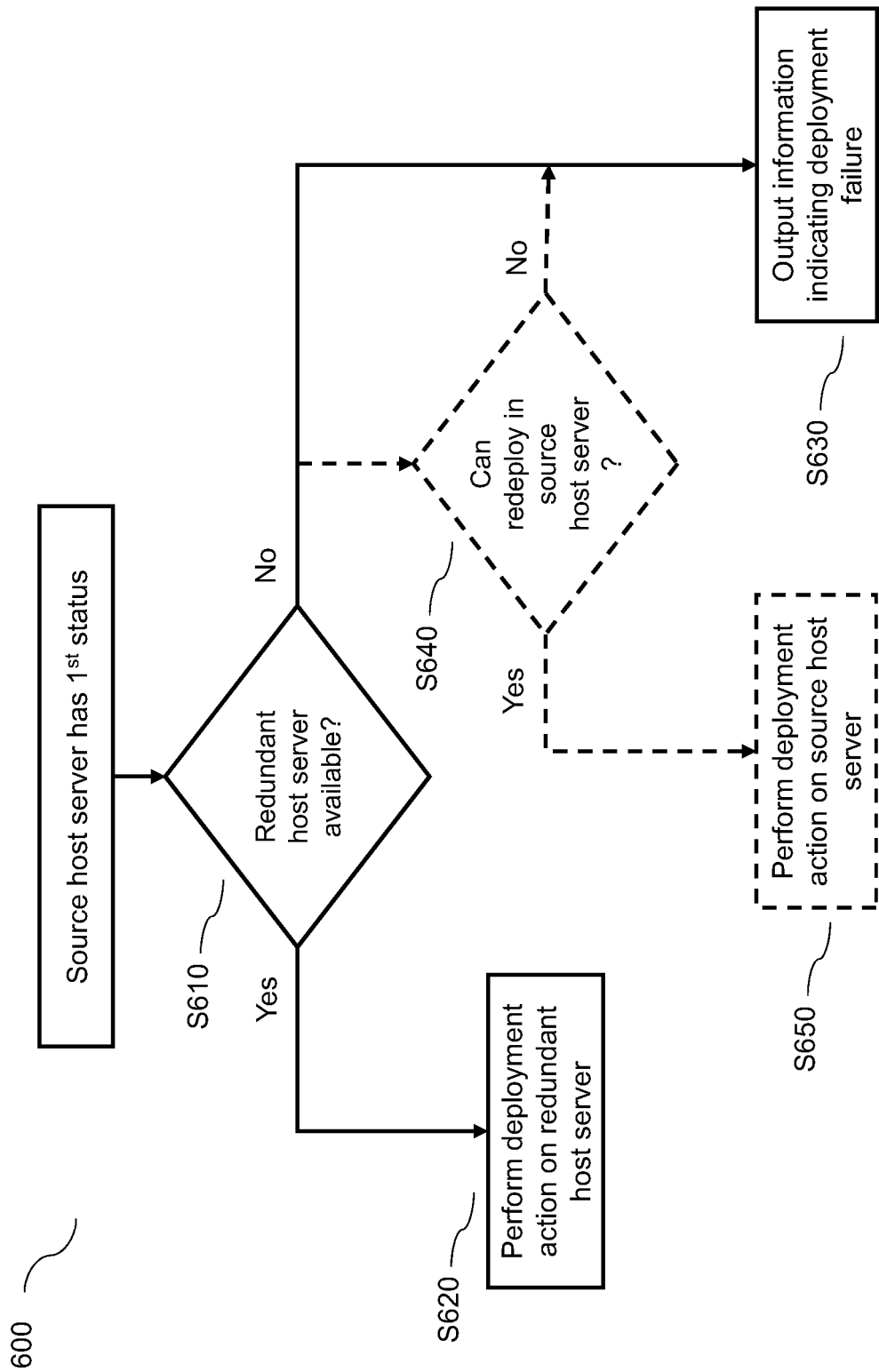
FIG. 6 is a flow diagram of a method 600 of determining an action for redeploying a network element, according to one or more example embodiments.

FIG. 6 is a flow diagram of a method 600 of determining an action for redeploying a network element, according to one or more example embodiments. Method 600 may be a part of method 500 in FIG. 5. Further, for the sake of brevity and conciseness, the host server which hosts or deploys the network element and has the first status is referred to as "source host server" herein below, and the backup/redundant host server or any host server which may redeploy the network element are collectively referred to as "redundant host server" hereinbelow.

Referring to FIG. 6, at operation S610, based on determining that a source host server has the first status (e.g., in operation S510 of FIG. 5), an availability of a redundant host server is determined. In some embodiments, based on determining that the source host server has the first status, the orchestrator system may be configured to communicate with a server cluster (e.g., server cluster 110) and to receive information/data from the server cluster so as to determine whether or not the server cluster has any available redundant host server.

At operation S620, based on determining that the redundant host server is available, a deployment action is performed on the redundant server (to be described below). At operation S630, based on determining that there is no available redundant host server, information indicating network element deployment failure is outputted. For instance, based on determining that there is no available redundant host server, the orchestrator system may be configured to output information indicating failure in deployment of the network element to the network element management system. In this regard, instead of performing a deployment action (e.g., in operation S520 of FIG. 5), the network element management system may be configured to generate a notification to inform the user regarding the network element deployment failure.

Optionally, based on determining that there is no available redundant host server, prior to outputting information indicating deployment failure (in operation S630), it is determined at operation S640 as to whether or not the network element can be redeployed in the source host server. Specifically, the orchestrator system may be configured to determine the available resources in the source host server and to determine whether or not it is possible to redeploy the network element in the source host server (e.g., according to a configuration defined by a secondary configuration profile, etc.). Accordingly, based on determining that the network element can be redeployed on the source host server, at optional operation S650 the orchestrator system may be configured to output information defining the action for redeploying the network element to the network element management system, and the network element management system may be configured to perform the action to redeploy the network element on the source host server accordingly. Otherwise, based on determining that it is not possible to redeploy the network element on the source host server, the process proceeds to operation S630 as described above, in which the information indicating network element deployment failure is outputted.

Figure 7:
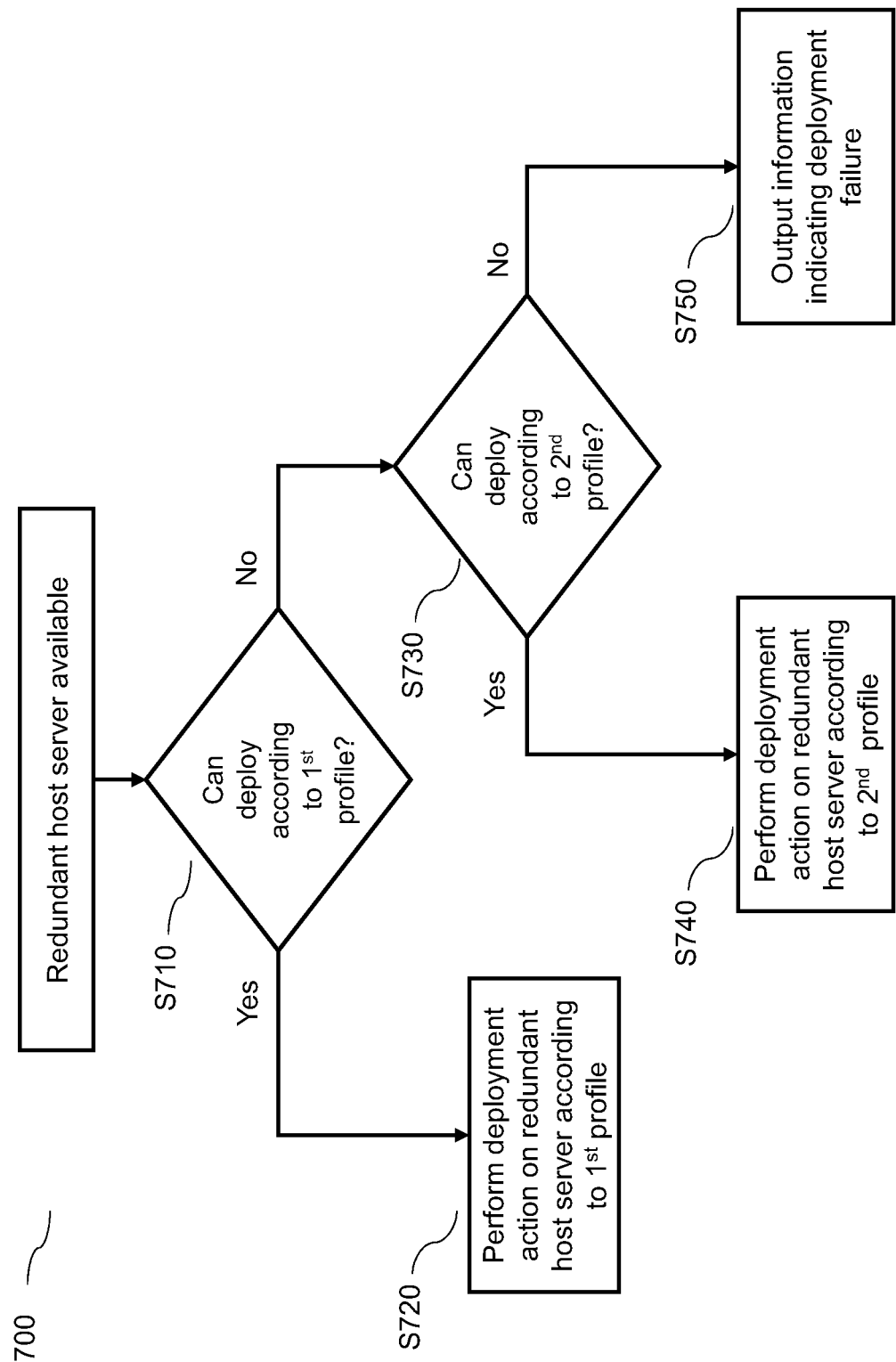
FIG. 7 is a flow diagram of a method 700 of performing a deployment action, according to one or more example embodiments.

FIG. 7 is a flow diagram of a method 700 of performing a deployment action, according to one or more example embodiments. Method 700 may be part of method 600 in FIG. 6.

Referring to FIG. 7, based on determining that a redundant host server is available (e.g., in operation S610 of FIG. 6), it is determined at operation S710 as to whether or not the network element can be redeployed on the redundant host server according to a first configuration profile associated with the network element. In some embodiments, the first configuration profile comprises a primary configuration profile, a default configuration profile, or a configuration profile having a highest utilization priority. In some embodiments, the orchestrator system may be configured to receive information defining the status of the redundant host server (e.g., a status of available hardware resources, a health status of the redundant host server, etc.), and may be configured to compare said status with configuration(s) defined by the first configuration profile. Based on determining that the status (e.g., hardware status) of the redundant host server complies with the configuration(s) defined by (or corresponding to) the first configuration profile, the orchestrator system determines that the network element can be deployed on the redundant host server according to the first configuration profile and the process proceeds to operation S720. Otherwise, the process proceeds to operation S730.

Still referring to FIG. 7, at operation S720, a deployment action for redeploying the network element on the redundant host server according to the first configuration profile is performed. In some embodiments, the orchestrator system may be configured to output information defining the deployment action (e.g., redeploying the network element on the redundant host server according to the first configuration profile) to the network element management system, and the network element management system may be configured to perform the action to redeploy the network element on the redundant host server accordingly.

On the other hand, based on determining that the network element cannot be redeployed on the redundant host server according to the first configuration profile, it is determined at operation S730 as to whether or not the network element can be redeployed on the redundant host server according to a second configuration profile associated with the network element. In some embodiments, the second configuration profile comprises a secondary configuration profile, a non-default configuration profile, or a configuration profile having a utilization priority lower than the first configuration profile. In some embodiments, the orchestrator system may be configured to compare the status of redundant host server (e.g., obtained in operation S710) with configuration(s) defined by (or corresponding to) the second configuration profile. Based on determining that the status of the redundant host server complies to the configuration(s) defined by the second configuration profile, the orchestrator system determines that the network element can be deployed on the redundant host server according to the second configuration profile and the process proceeds to operation S740. Otherwise, the process proceeds to operation S750.

Still referring to FIG. 7, at operation S740, a deployment action for redeploying the network element on the redundant host server according to the second configuration profile is performed. In some embodiments, the orchestrator system may be configured to output information defining the deployment action (e.g., redeploying the network element on the redundant host server according to the second configuration profile) to the network element management system, and the network element management system may be configured to perform the action to redeploy the network element on the redundant host server accordingly.

At operation S750, based on determining that the network element cannot be deployed on the redundant host server according to the second configuration profile, an information indicating deployment failure is outputted. Operation S750 may correspond to operation S630 in FIG. 6, and thus the detailed descriptions related thereto are omitted for conciseness.

Optionally, based on determining that the network element cannot be deployed on the redundant host server according to the second configuration profile, prior to outputting information indicating deployment failure, it is determined whether or not the network element can be redeployed in the source host server (e.g., according to the second configuration profile, etc.). In that case, based on determining that the network element can be redeployed in the source host server, a deployment action for redeploying the network element on the source host server is performed. The related operations and processes may correspond to optional operations S640 and S650, and thus the detailed descriptions related thereto are not repeated below for conciseness.

It will be apparent that methods and operations described in FIGS. 5-7 are merely example embodiments, and the present disclosures may also implement methods and operations which are not illustrated in FIGS. 5-7.

For instance, in some embodiments, prior to outputting the information indicating network deployment failure (e.g., in operations S630 and S750), based on determining that the redundant host server is available but does not has sufficient resources to redeploy the network element according to the first configuration profile and the second configuration profile, the orchestrator system may be configured to determine whether or not the network element can be redeployed in the redundant host server according to a subsequent configuration profile (e.g., a third configuration profile, etc.), and then determine an action for deployment the network element accordingly. In some embodiments, the orchestrator system may be configured to perform this process iteratively on all configuration profiles associated with the network element based on the sequential order or utilization priority of the configuration profiles (e.g., based on determining that the network element cannot be deployed in the redundant host server according to the third configuration profile, determine whether or not the network element can be deployed in the redundant host server according to a fourth configuration profile, etc.). After checking the possibility to redeploy the network element according to each and all of the associated configurations profiles, and the network element still cannot be deployed on the redundant host server, the orchestrator server may continue determining whether or not the network element can be redeployed in the source host server (as described in optional operations S640), or may output the information indicating network deployment failure. To this end, the rate of the user receiving false alarm (i.e., false indication of network element(s) deployment failure when the host server in fact has sufficient resources to deploy the network element(s)) can be reduced, and example embodiments will attempt to maintain the availability of the network elements as much as possible.

In some embodiments, based on determining that a plurality of network elements in the source host server is required to be redeployed but the redundant host server can only deploy or host a portion of the plurality of network elements, the orchestrator system may be configured to determine an action for deploying only the portion of the plurality of network elements on the redundant host server. In that case, the orchestrator system may be configured to determine an action for deploying only (or at least) network elements of critical network service(s) or for deploying only (or at least) network elements associated with configuration profiles which have high utilization priority. In some embodiments, in addition to determining action for deploying the portion of network elements in the redundant host server, the orchestrator system may also be configured to determine whether or not the server cluster includes any host server (server hosting other network elements) which can deploy or host the remaining portion of the network elements. In that case, based on determining that there is a host server(s) which can deploy or host the remaining portion of the network elements, the orchestrator system may be configured to determine an action for deploying the remaining portion of the network elements in the host server(s). For instance, a portion of network elements may be redeployed in the redundant host server according to a fourth configuration defined by a fourth configuration profile, and the remaining portion of network elements may be redeployed in one or more host servers according to a fifth configuration defined by a fifth configuration profile. Accordingly, the system will attempt to redeploy as many network elements hosted in the source host server as possible, so as to reduce the number of affected network elements and thereby minimizing the impact on the associated network service.

Further, in some embodiments, after redeploying network elements in the redundant host server, the orchestrator system may be configured to continuously (or periodically) determine an updated status of the source host server (e.g., based on data continuously or periodically provided by monitoring system, etc.). Based on determining that the source host server has recovered to a status which has sufficient resources to redeploy one or more network elements, the orchestrator system may be configured to determine an action for redeploying the one or more network elements on the source host server and for clearing the one or more network elements from the redundant host server. For instance, based on determining that the source host server has sufficient resources to redeploy all network elements according to the a configuration profile among a plurality of configuration profiles associated with the network elements, the orchestrator system may be configured to determine an action for redeploying all network elements on the source host server based on the configuration defined by the configuration profile; on the other hand, based on determining that the source host server has resources to redeploy a portion of the network elements, the orchestrator system may be configured to determine an action for deploying only the portion of the plurality of network elements on the source host server. In that case, the orchestrator system may be configured to determine an action for deploying only network elements of critical network service(s) or for deploying only network elements associated with configuration profiles which have high utilization priority. To this end, an example embodiment may start redeploying the network elements on the source host server as soon as the resources of the source host server begin to recover, such that the consumption of the resources of the redundant host server can be timely reduced.

Figure 8:
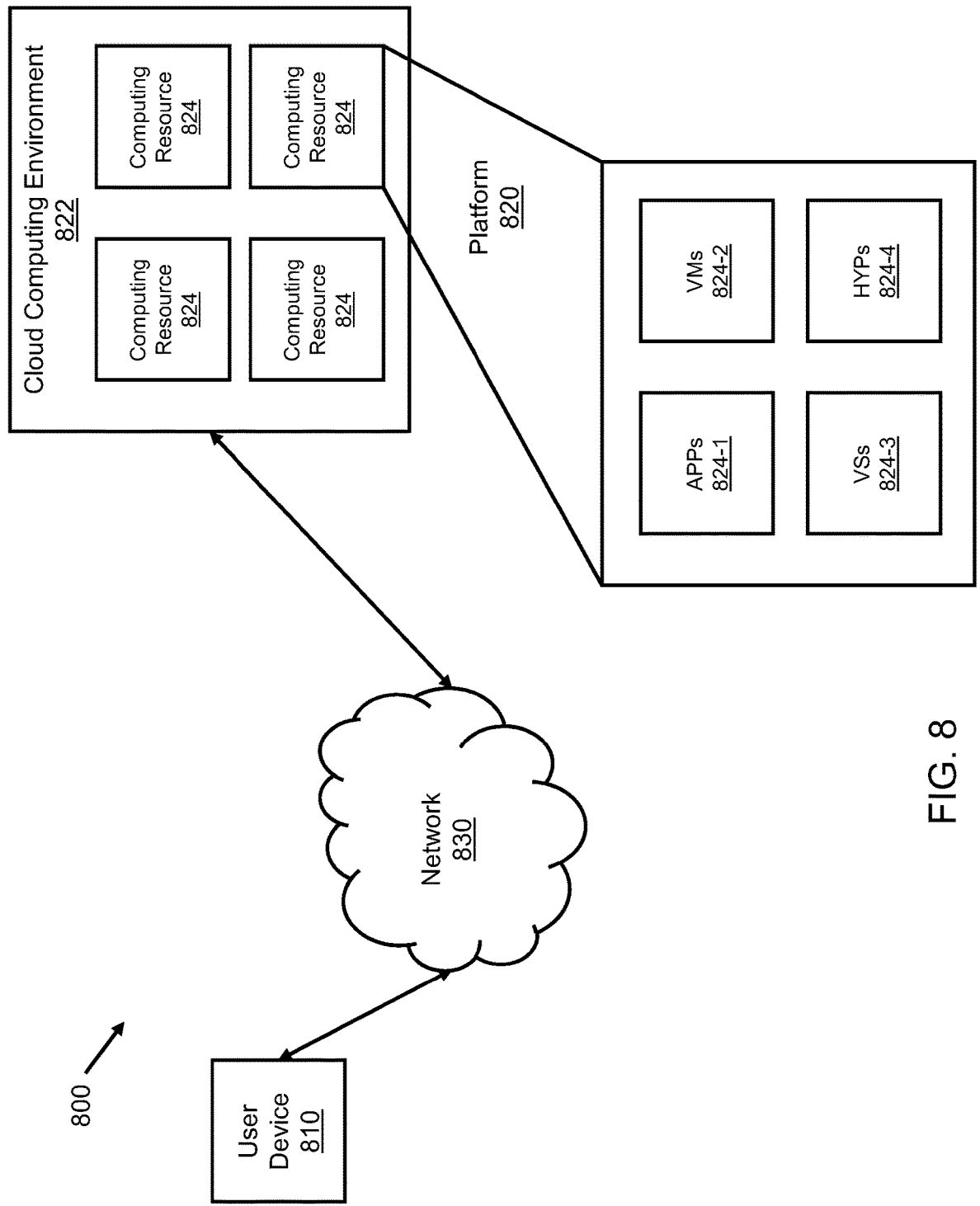
FIG. 8 is a diagram of an example environment in which systems and/or methods, described herein, may be implemented.

FIG. 8 is a diagram of an example environment 800 in which systems and/or methods, described herein, may be implemented. As shown in FIG. 8, environment 800 may include a user device 810, a platform 820, and a network 830. Devices of environment 800 may interconnect via wired connections, wireless connections, or a combination of wired and wireless connections. In embodiments, any of the functions and operations described with reference to FIGS. 1 through 7 above may be performed by any combination of elements illustrated in FIG. 8.

User device 810 includes one or more devices capable of receiving, generating, storing, processing, and/or providing information associated with platform 820. For example, user device 810 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), a SIM-based device, or a similar device. In some implementations, user device 810 may receive information from and/or transmit information to platform 820.

Platform 820 includes one or more devices capable of receiving, generating, storing, processing, and/or providing information. In some implementations, platform 820 may include a cloud server or a group of cloud servers. In some implementations, platform 820 may be designed to be modular such that certain software components may be swapped in or out depending on a particular need. As such, platform 820 may be easily and/or quickly reconfigured for different uses.

In some implementations, as shown, platform 820 may be hosted in cloud computing environment 822. Notably, while implementations described herein describe platform 820 as being hosted in cloud computing environment 822, in some implementations, platform 820 may not be cloud-based (i.e., may be implemented outside of a cloud computing environment) or may be partially cloud-based.

Cloud computing environment 822 includes an environment that hosts platform 820. Cloud computing environment 822 may provide computation, software, data access, storage, etc. services that do not require end-user (e.g., user device 810) knowledge of a physical location and configuration of system(s) and/or device(s) that hosts platform 820. As shown, cloud computing environment 822 may include a group of computing resources 824 (referred to collectively as "computing resources 824" and individually as "computing resource 824").

Computing resource 824 includes one or more personal computers, a cluster of computing devices, workstation computers, server devices, or other types of computation and/or communication devices. In some implementations, computing resource 824 may host platform 820. The cloud resources may include compute instances executing in computing resource 824, storage devices provided in computing resource 824, data transfer devices provided by computing resource 824, etc. In some implementations, computing resource 824 may communicate with other computing resources 824 via wired connections, wireless connections, or a combination of wired and wireless connections.

As further shown in FIG. 8, computing resource 824 includes a group of cloud resources, such as one or more applications ("APPs") 824-1, one or more virtual machines ("VMs") 824-2, virtualized storage ("VSs") 824-3, one or more hypervisors ("HYPs") 824-4, or the like.

Application 824-1 includes one or more software applications that may be provided to or accessed by user device 810. Application 824-1 may eliminate a need to install and execute the software applications on user device 810. For example, application 824-1 may include software associated with platform 820 and/or any other software capable of being provided via cloud computing environment 822. In some implementations, one application 824-1 may send/receive information to/from one or more other applications 824-1, via virtual machine 824-2.

Virtual machine 824-2 includes a software implementation of a machine (e.g., a computer) that executes programs like a physical machine. Virtual machine 824-2 may be either a system virtual machine or a process virtual machine, depending upon use and degree of correspondence to any real machine by virtual machine 824-2. A system virtual machine may provide a complete system platform that supports execution of a complete operating system ("OS"). A process virtual machine may execute a single program, and may support a single process. In some implementations, virtual machine 824-2 may execute on behalf of a user (e.g., user device 810), and may manage infrastructure of cloud computing environment 822, such as data management, synchronization, or long-duration data transfers.

Virtualized storage 824-3 includes one or more storage systems and/or one or more devices that use virtualization techniques within the storage systems or devices of computing resource 824. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 824-4 may provide hardware virtualization techniques that allow multiple operating systems (e.g., "guest operating systems") to execute concurrently on a host computer, such as computing resource 824. Hypervisor 824-4 may present a virtual operating platform to the guest operating systems, and may manage the execution of the guest operating systems. Multiple instances of a variety of operating systems may share virtualized hardware resources.

Network 830 includes one or more wired and/or wireless networks. For example, network 830 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
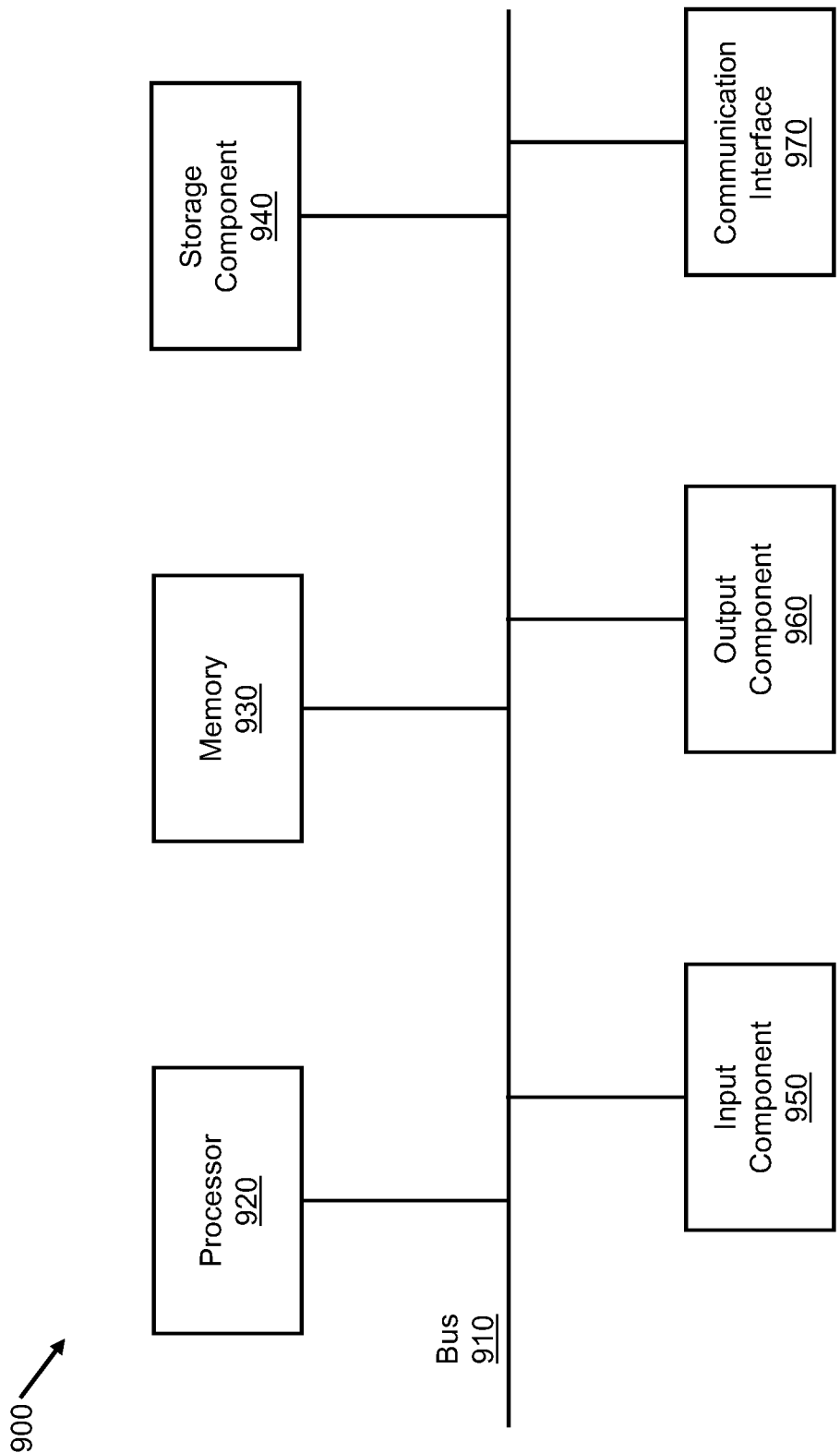
FIG. 9 is a diagram of example components of a device according to an embodiment.

FIG. 9 is a diagram of example components of a device 900. Device 900 may correspond to user device 810 and/or platform 820. As shown in FIG. 9, device 900 may include a bus 910, a processor 920, a memory 930, a storage component 940, an input component 950, an output component 960, and a communication interface 970.

Bus 910 includes a component that permits communication among the components of device 900. Processor 920 may be implemented in hardware, firmware, or a combination of hardware and software. Processor 920 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 950 includes a component that permits device 900 to receive information, such as via user input (e.g., a touch screen display, a keyboard, a keypad, a mouse, a button, a switch, and/or a microphone). Additionally, or alternatively, input component 950 may include a sensor for sensing information (e.g., a global positioning system (GPS) component, an accelerometer, a gyroscope, and/or an actuator). Output component 960 includes a component that provides output information from device 900 (e.g., a display, a speaker, and/or one or more light-emitting diodes (LEDs)).

Communication interface 970 includes a transceiver-like component (e.g., a transceiver and/or a separate receiver and transmitter) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, or the like.

Device 900 may perform one or more processes described herein. Device 900 may perform these processes in response to processor 920 executing software instructions stored by a non-transitory computer-readable medium, such as memory 930 and/or storage component 940. A computer-readable medium is defined herein as a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

In embodiments, any one of the operations or processes of FIGS. 3 through 7 may be implemented by or using any one of the elements illustrated in FIGS. 8 and 9.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, function, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the function involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus comprising:
   a memory storing instructions; and
   at least one processor configured to execute the instructions to:
   determine a status of a server hosting a network element;
   based on determining that the server has a first status:
   determine, based on a configuration profile from among a plurality of configuration profiles associated with the network element, an action for redeploying the network element; and
   output information defining the action for redeploying the network element;
   based on determining that the server has a second status:

determine an updated status of the server after a period of time from determining that the server has the second status; and determine, based on the updated status of the server, whether or not to redeploy the network element after the period of time.

2. The apparatus as claimed in claim 1,
wherein the first status of the server comprises:
a partial hardware failure status in which the server has hardware resources to host the network element without complying with a first configuration for deploying the network element under a normal status, wherein the first configuration is defined in the configuration profile; or
a full hardware failure status in which the server has no hardware resources to host the network element; and
wherein the second status of the server comprises the normal status in which the server has hardware resources to host the network element according to the first configuration.

3. The apparatus as claimed in claim 1,
wherein the server is a source host server;
wherein the at least one processor is configured to execute the instructions to:
based on determining that the server has the first status, determine whether or not the network element can be redeployed on a redundant host server according to a first configuration defined by the configuration profile; and
based on determining that the network element can be redeployed on the redundant host server according to the first configuration, determine that the action for redeploying the network element is an action for redeploying the network element on the redundant host server according to the first configuration.

4. The apparatus as claimed in claim 3,
wherein the configuration profile comprises a first configuration profile defining the first configuration and a second configuration profile defining a second configuration for deploying the network element, wherein the first configuration is different from the second configuration;
wherein the at least one processor is configured to execute the instructions to:
based on determining that the server has the first status:
determine whether or not the network element can be redeployed on the redundant host server according to the first configuration;
based on determining that the network element can be redeployed on the redundant host server according to the first configuration, determine that the action for redeploying the network element is an action for redeploying the network element on the redundant host server according to the first configuration;
based on determining that the network element cannot be redeployed on the redundant host server according to the first configuration, determine whether or not the network element can be redeployed on the redundant host server according to the second configuration; and
based on determining that the network element can be redeployed on the redundant host server according to the second configuration, determine that the action for redeploying the network element is an action for redeploying the network element on the redundant host server according to the second configuration.

5. The apparatus as claimed in claim 4, wherein the second configuration defines a minimum resource requirement for deploying the network element to achieve essential operational performance, and wherein the at least one processor is configured to execute the instructions to:
based on determining that the network element cannot be redeployed on the redundant host server according to the second configuration, output information indicating a deployment failure of the network element.

6. The apparatus as claimed in claim 4, wherein the at least one processor is configured to execute the instructions to:
based on determining that the network element cannot be redeployed on the redundant host server according to the second configuration, determine whether or not the network element can be redeployed on the source host server according to the second configuration;
based on determining that the network element can be redeployed on the source host server according to the second configuration, determine that the action for redeploying the network element is an action for redeploying the network element on the source host server according to the second configuration; and
based on determining that the network element cannot be redeployed on the source host server according to the second configuration, output information indicating a deployment failure of the network element.

7. The apparatus as claimed in claim 4, wherein the at least one processor is configured to execute the instructions to:
after outputting the information defining the action for redeploying the network element on the redundant host server, monitor the status of the source host server; and
based on determining that the status of the source host server changes from the first status to the second status, output information defining an action for redeploying the network element on the source host server.

8. The apparatus as claimed in claim 4,
wherein the first configuration defines an optimal resource requirement for deploying the network element to achieve optimal operational performance;
wherein the second configuration defines a minimum resource requirement for deploying the network element to achieve essential operational performance; and
wherein each of the first configuration and the second configuration comprises a respective configuration of one or more of: number of cells per central unit, number of cells per radio unit, number of simultaneous processing per second, number of supported users, number of radio unit, number of distribution unit, number of uplink data layer, number of downlink data layer, capacity of memory, number of processing unit, number of cores per processing unit, clock frequency per processing unit, channel bandwidth, downlink/uplink throughput, number of single root input/output virtualization (SR-IOV), requirement of non-uniform memory access (NUMA), number of ports per network interface controller (NIC), and requirement of hardware acceleration.

9. A method, performed by at least one processor, comprising:
determining a status of a server hosting a network element;
based on determining that the server has a first status:

determining, based on a configuration profile from among a plurality of configuration profiles associated with the network element, an action for redeploying the network element; and outputting information defining the action for redeploying the network element;

based on determining that the server has a second status:
determining an updated status of the server after a period of time from determining that the server has the second status; and
determining, based on the updated status of the server, whether or not to redeploy the network element after the period of time.

10. The method as claimed in claim 9,
wherein the first status of the server comprises:
a partial hardware failure status in which the server has hardware resources to host the network element without complying with a first configuration for deploying the network element under a normal status, wherein the first configuration is defined in the configuration profile; or
a full hardware failure status in which the server has no hardware resources to host the network element; and
wherein the second status of the server comprises the normal status in which the server has hardware resources to host the network element according to the first configuration.

11. The method as claimed in claim 9, wherein the server is a source host server, wherein the determining of the action for redeploying the network element comprising;
based on determining that the server has the first status, determining whether or not the network element can be redeployed on a redundant host server according to a first configuration defined by the configuration profile; and
based on determining that the network element can be redeployed on the redundant host server according to the first configuration, determining that the action for redeploying the network element is an action for redeploying the network element on the redundant host server according to the first configuration.

12. The method as claimed in claim 11,
wherein the configuration profile comprises a first configuration profile defining the first configuration and a second configuration profile defining a second configuration for deploying the network element, wherein the first configuration is different from the second configuration; and
wherein the determining of the action for redeploying the network element comprising:
determining whether or not the network element can be redeployed on the redundant host server according to the first configuration;
based on determining that the network element can be redeployed on the redundant host server according to the first configuration, determining that the action for redeploying the network element is an action for redeploying the network element on the redundant host server according to the first configuration;
based on determining that the network element cannot be redeployed on the redundant host server according to the first configuration, determining whether or not the network element can be redeployed on the redundant host server according to the second configuration; and
based on determining that the network element can be redeployed on the redundant host server according to the second configuration, determining that the action for redeploying the network element is an action for redeploying the network element on the redundant host server according to the second configuration.

13. The method as claimed in claim 12, wherein the second configuration defines a minimum resource requirement for deploying the network element to achieve essential operational performance, wherein the method further comprising:
based on determining that the network element cannot be redeployed on the redundant host server according to the second configuration, outputting information indicating a deployment failure of the network element.

14. The method as claimed in claim 12, further comprising:
based on determining that the network element cannot be redeployed on the redundant host server according to the second configuration, determining whether or not the network element can be redeployed on the source host server according to the second configuration;
based on determining that the network element can be redeployed on the source host server according to the second configuration, determining that the action for redeploying the network element is an action for redeploying the network element on the source host server according to the second configuration; and
based on determining that the network element cannot be redeployed on the source host server according to the second configuration, outputting information indicating a deployment failure of the network element.

15. The method as claimed in claim 12, further comprising:
after outputting the information for redeploying the network element on the redundant host server, monitoring the status of the source host server; and
based on determining that the status of the source host server changes from the first status to the second status, outputting information defining an action for redeploying the network element on the source host server.

16. The method as claimed in claim 12,
wherein the first configuration defines an optimal resource requirement for deploying the network element to achieve optimal operational performance;
wherein the second configuration defines a minimum resource requirement for deploying the network element to achieve essential operational performance; and
wherein each of the first configuration and the second configuration comprises a respective configuration of one or more of: number of cells per central unit, number of cells per radio unit, number of simultaneous processing per second, number of supported users, number of radio unit, number of distribution unit, number of uplink data layer, number of downlink data layer, capacity of memory, number of processing unit, number of cores per processing unit, clock frequency per processing unit, channel bandwidth, downlink/uplink throughput, number of single root input/output virtualization (SR-IOV), requirement of non-uniform memory access (NUMA), number of ports per network interface controller (NIC), and requirement of hardware acceleration.

17. A non-transitory computer-readable recording medium having recorded thereon instructions executable by a processor to cause the processor to perform a method comprising:
- determining a status of a server hosting a network element;
- based on determining that the server has a first status:
  - determining, based on a configuration profile from among a plurality of configuration profiles associated with the network element, an action for redeploying the network element; and
  - outputting information defining the action for redeploying the network element;
- based on determining that the server has a second status:
  - determining an updated status of the server after a period of time from determining that the server has the second status; and
  - determining, based on the updated status of the server, whether or not to redeploy the network element after the period of time.

18. The non-transitory computer-readable recording medium as claimed in claim 17, wherein the first status of the server comprises:
- a partial hardware failure status in which the server has hardware resources to host the network element without complying with a first configuration for deploying the network element under a normal status, wherein the first configuration is defined in the configuration profile; or
- a full hardware failure status in which the server has no hardware resources to host the network element; and
- wherein the second status of the server comprises the normal status in which the server has hardware resources to host the network element according to the first configuration defined in the configuration profile.

19. The non-transitory computer-readable recording medium as claimed in claim 17, wherein the server is a source host server, wherein the determining of the action for redeploying the network element comprising:
- based on determining that the server has the first status, determining whether or not the network element can be redeployed on a redundant host server according to a first configuration defined by the configuration profile; and
- based on determining that the network element can be redeployed on the redundant host server according to the first configuration, determining that the action for redeploying the network element is an action for redeploying the network element on the redundant host server according to the first configuration.

20. The non-transitory computer-readable recording medium as claimed in claim 19,
- wherein the configuration profile comprises a first configuration profile defining the first configuration and a second configuration profile defining a second configuration for deploying the network element, wherein the first configuration is different from the second configuration; and
- wherein the determining of the action for redeploying the network element comprising:
  - determining whether or not the network element can be redeployed on the redundant host server according to the first configuration;
  - based on determining that the network element can be redeployed on the redundant host server according to the first configuration, determining that the action for redeploying the network element is an action for redeploying the network element on the redundant host server according to the first configuration;
  - based on determining that the network element cannot be redeployed on the redundant host server according to the first configuration, determining whether or not the network element can be redeployed on the redundant host server according to the second configuration; and
  - based on determining that the network element can be redeployed on the redundant host server according to the second configuration, determining that the action for redeploying the network element is an action for redeploying the network element on the redundant host server according to the second configuration.

* * * * *